No Printed Specification Available
736X
J. Fox.
Patented Feb. 25, 1807.
Oliver.
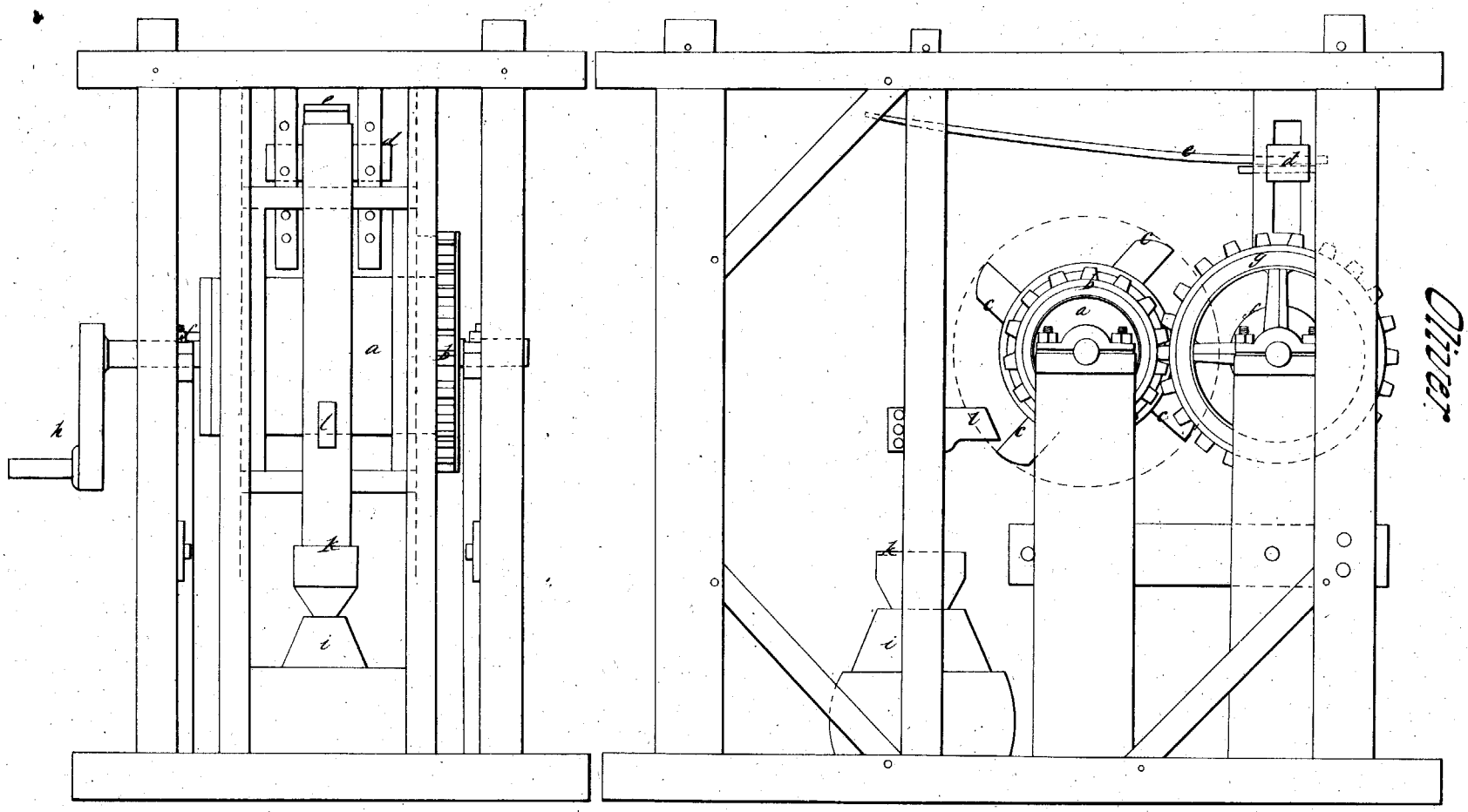
THE GRAPHIC CO. PHOTO-LITH. 39 & 41 PARK PLACE, N.Y.

736x Feb 25. 1807 1

Joel Foy Junr.
Letters Patent
Issued Feb. 25. 1807.

The Schedule referred to in and making part of these Letters Patent, containing a Description in the Words of the said Joel Foy Junr. himself of his machine for working a Trip Hammer with the handle in a perpendicular position.

---

This Machine consists of a Frame nine feet long, six feet wide and eight feet high braced at top & bottom, four cross sills, a large Shaft with a Cogwheel and Wild Cat on which is four Cams, a Slider, & a Spring: two posts five & a half feet high, on which is placed a Shaft, on which are a Cog wheel & a Crank: an anvil, Hammer and a hammer handle with one Cam. The large Shaft & the Slider are placed parallel on the Beams of the Frame; the Crank is turned by a water-wheel; the Cogs of the Crank shaft connect with the Cogs of the large Shaft & turn that Shaft: The Cams of the wild Cat on that shaft catch the cam of the Hammer-handle as the shaft turns, & raise the Hammer four times at one turn of the Shaft: the Spring is riveted upon one end of the Slider & extends thence to the upper end of the Hammer-handle; with which it is connected and serves to force the Hammer upon the Iron with a suitable degree of velocity. This machine may be enlarged or diminished and an addition made to or deduction from any of its parts as will be best suited to the Stream of water by which it may be worked, & will be the best calculated to facilitate the manufacture of the different materials which may be wrought in it. —

Witnesses
Daniel Varnum
J. B. Varnum

Joel Foy Junr.

[illegible]

(300 words)